Figure 1:
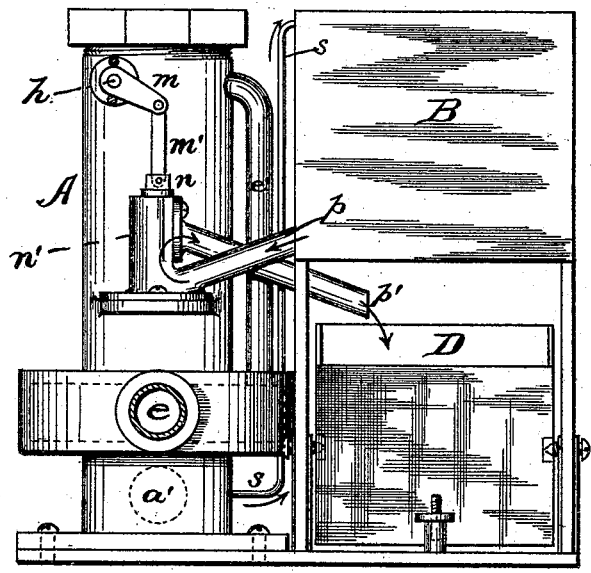

(No Model.) 2 Sheets—Sheet 1.

W. D. HAWLEY & S. J. HOGAN.
PROPORTIONAL METER.

No. 496,827. Patented May 2, 1893.

WITNESSES:
H. A. Carhart
Geo. M. Blowers

INVENTORS.
William D. Hawley
Silas J. Hogan
BY Smith & Denison
their ATTORNEYS.

(No Model.) 2 Sheets—Sheet 2.

W. D. HAWLEY & S. J. HOGAN.
PROPORTIONAL METER.

No. 496,827. Patented May 2, 1893.

WITNESSES:
H. A. Carhart
Geo. M. Blowers

INVENTORS.
William D. Hawley
Silas J. Hogan
BY
Smith & Denison
their ATTORNEYS.

UNITED STATES PATENT OFFICE.

WILLIAM D. HAWLEY AND SILAS J. HOGAN, OF SYRACUSE, NEW YORK.

PROPORTIONAL METER.

SPECIFICATION forming part of Letters Patent No. 496,827, dated May 2, 1893.

Application filed May 26, 1892. Serial No. 434,452. (No model.)

*To all whom it may concern:*

Be it known that we, WILLIAM D. HAWLEY and SILAS J. HOGAN, of Syracuse, in the county of Onondaga, in the State of New York, have invented new and useful Improvements in Meters, of which the following, taken in connection with the accompanying drawings, is a full, clear, and exact description.

Our invention relates to meters for measuring liquids, fluids, gases, &c.

Our object is to produce an improved meter, based upon the relation or ratio which the flow of water from a tank bears to the flow through the main pipe, such tank flow being of less head or pressure than the pipe flow; and by providing the tank flow pipe and the main pipe with valves acting simultaneously through their connection, and insuring the simultaneous flow through both valves; and by providing the tank with means by which the water therein is always maintained at a predetermined level, thus always insuring an equal or uniform head and an even and uniform flow through the tank valve; and in case the tank is filled and kept full through a connection to the main pipe, said mechanism for keeping up the water level in the tank, also operates to reduce the water from the main pressure as it flows into the tank, to the tank head pressure upon the tank valve; the flow from the tank being conducted into a measuring device, whereby it is measured, and by suitable mechanism, recorded.

Our invention consists in the several novel features of construction and operation hereinafter described and which are specifically set forth in the claims hereto annexed. It is constructed as follows, reference being had to the accompanying drawings, in which—

Figure 2:
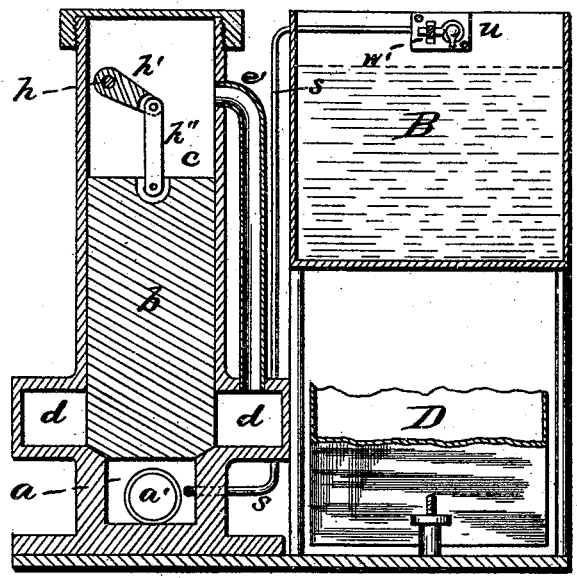
Figure 5:
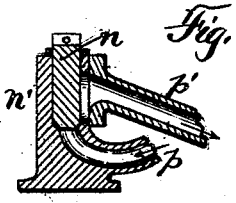
Figure 3:
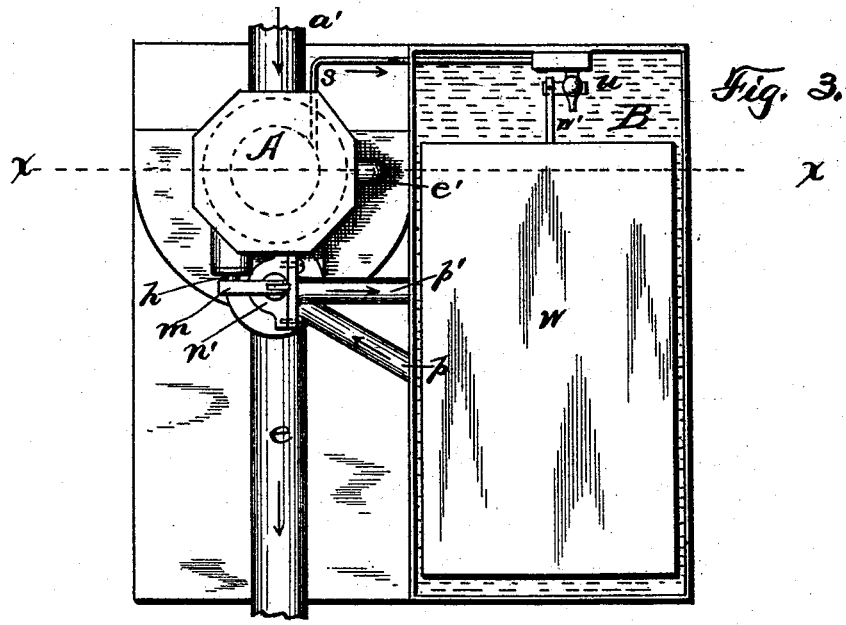
Figure 4:
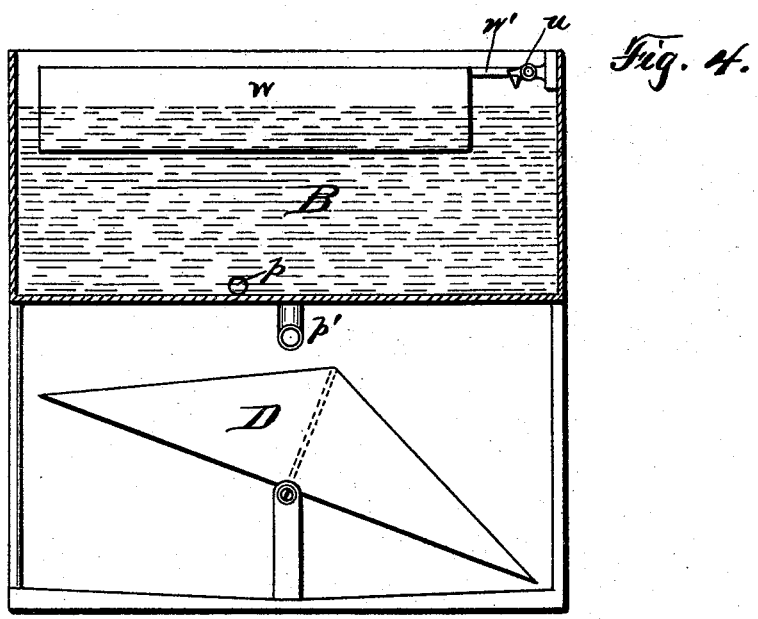

Figure 1, is a front elevation of the meter complete, except the recording mechanism. Fig. 2, is a vertical transverse section on line *x x*, in Fig. 3, omitting the float in the tank. Fig. 3 is a top plan. Fig. 4, is a sectional elevation of the tank, the float, and the tilting measuring bucket, on a line longitudinal to the tank. Fig. 5, is a vertical section of the tank valve.

A—, is the main valve casing, provided with an inlet chamber —*a*— connected at one end to the induction pipe —*a'*— normally closed by the valve —*b*— suitably seated thereon within the valve chamber —*c*—, the lower end of said valve chamber being enlarged as at —*d*—, creating an eduction conduit from the inlet chamber, when the valve is raised or opened. This eduction conduit is curved, or of substantially horseshoe form, the valve —*b*— and its seat being at the center of the curve thereof, so that said valve, when closed, forms the inner wall of this conduit, and when it is opened permits water to pass very freely into the enlarged eduction chamber within, and created by the conduit, and partially at least, surrounding said valve. The eduction pipe —*e*— is connected to the outer side of said conduit, at a point substantially midway between the extremities thereof, as shown in Fig. 3. A pipe —*e'*— is connected to one arm of this eduction chamber, and at the other end opens into the main valve chamber —*c*— above the main valve, whereby whenever the main valve is opened, the same pressure is almost instantaneously produced upon the top of the valve.

A shaft —*h*— is inserted horizontally through one wall of the main valve chamber, with a suitable stuffing box packing, and provided on its inner end with a crank arm —*h'*— and a connecting rod —*h''*— is connected at one end to it, and at the other to the top of the main valve. The outer end of this shaft is also provided with a crank arm —*m*— and a concentric rod —*m'*— connects this to the valve —*n*— in the valve chamber —*n'*— so that whenever the main valve is moved vertically, the other valve is simultaneously moved in the same direction up or down.

B—, is a water tank supported above the valve chamber —*n'*— at the height desired and sufficient to give the water free flow therefrom through the pipe —*p*—, into the valve chamber —*n'*—, and the eduction pipe —*p'*—, therefrom conducts the water which passes through this valve chamber, into the tilting measuring bucket —D— which, when full on one side tilts and presents the empty side to be filled, and empties the side which is full. The water discharged therefrom is conducted away in any ordinary manner.

In the drawings we show the tank —B— as adapted to be supplied from the main induction water pipe through the pipe —*s*—, but it may be supplied from any source. In this tank we place a float —w— provided with an arm —w'— which is connected to the stem end of an ordinary cut off valve —u—, and as this float and valve are of ordinary construction, we do not here fully describe their construction.

The operation of this float is to, at all times, maintain the water in the tank at substantially a uniform level, so that the head of the water upon the tank valve —n— is always substantially the same, so that the flow through the valve is always substantially the same whenever it is opened a certain distance, and such flow is always constantly in ratio with the flow through the main valve from the induction pipe, and consequently each bucket of water measured and dumped (and recorded) represents a fixed and predetermined number of gallons of water, no matter what the pressure is in the induction pipe, nor how much it varies; so, that by the mechanism here shown, one gallon of water measured and dumped represents one hundred gallons passing from the induction, into the eduction pipe. This is all accomplished by the simultaneous action of the valves, coupled with the reduction of the measuring liquid to a fixed, uniform and predetermined head, in the tank, no matter what its pressure or head is upon the float valve.

We have shown the measuring water as drawn into the tank, from the induction pipe, which is all right for water, but for steam, gases, oils and liquids or fluids of other kinds, it is evident that the measuring water must be supplied to the tank from another convenient source; but from whatever source supplied, it is, by the tank and the float therein, reduced to a fixed and predetermined head upon the tank eduction valve, and herein is a very strong point in our invention. When made in this manner our meter is adapted to be used in any position, no matter how great or small the head upon the induction pipe.

It will be seen that the quantity of water in the chamber —C— will vary with the raising or lowering of the main valve —b—; that the raising of it will force some water back through the pipe —e'— into the eduction chamber —d—; that its lowering will reverse the flow; that the valve —b— is opened by the creation of a partial vacuum in the eduction pipe when water is being drawn therefrom; and the suction created thereby upon the induction pipe; and that as soon as the flow of water through the valve is stopped, the top and bottom pressure thereon being equal, the natural gravity of the main-valve aided by the weight of the water in the chamber —C— will close the valve, and shut off the flow of water. The valve is opened by the force incident to the suction added to the natural head in the induction pipe, remains open as long as such suction continues, and closes as soon as the lifting force thereof is removed by the closing of the draw-off faucet.

What we claim as our invention, and desire to secure by Letters Patent, is—

1. The combination with the induction and eduction pipes and the valve between them, of the curved water chamber around said valve and connected to both of said pipes, the chamber above the valve, and the pipe connecting said chambers, of a crank shank connected to said valve within the valve chamber and at its outer end operatively connected to the lesser valve, exterior to the main valve chamber, whereby both valves are operated simultaneously.

2. The combination with the induction and eduction pipes, the main valve directly between them, the lesser valve operatively connected to the main valve, whereby both valves are operated simultaneously, of a water tank connected to the water main and to said lesser valve and means to automatically regulate the supply of water to the tank.

3. The combination with the induction and eduction pipes, directly connected to opposite sides of the valve chamber, the valve chamber and valve therein, directly between said pipes, and the lesser valve operatively connected to the main valve, whereby both valves are operated simultaneously, of the water tank, the pipe connecting it to the induction pipe, and means to automatically regulate the flow of water into the tank to maintain a predetermined water level therein.

4. The combination with the induction and eduction pipes, connected to opposite sides of the valve chamber in parallel planes, and substantially in alignment with each other, the valve chamber and the valve therein directly between said pipes, and the lesser valve operatively connected to the main valve, whereby both valves are operated simultaneously, of the water tank, the pipe connecting it to the induction pipe, means to automatically maintain a predetermined water level in the tank, the pipe connecting said tank to the lesser valve, and means to measure the flow through the lesser valve.

In witness whereof we have hereunto set our hands this 23d day of May, 1892.

WM. D. HAWLEY.
SILAS J. HOGAN.

In presence of—
C. W. SMITH,
HOWARD P. DENISON.